(12) United States Patent
Cho et al.

(10) Patent No.: US 7,854,526 B2
(45) Date of Patent: Dec. 21, 2010

(54) LAMP HOLDER

(75) Inventors: Chin-Hsing Cho, Yunlin County (TW); Sheng-Chieh Chao, Taoyuan County (TW); Tsao-Yuan Fu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 136 days.

(21) Appl. No.: 12/409,530

(22) Filed: Mar. 24, 2009

(65) Prior Publication Data

US 2010/0124042 A1 May 20, 2010

(30) Foreign Application Priority Data

Nov. 18, 2008 (TW) ............................... 97144516 A (51) Int. Cl.
*G09F 13/04* (2006.01)

(52) U.S. Cl. ...................... 362/97.2; 362/97.1; 362/64; 362/396

(58) Field of Classification Search ................ 362/97.1, 362/97.2, 614, 396; 349/70
See application file for complete search history.

(56) References Cited

U.S. PATENT DOCUMENTS

| 7,163,328 | B2 * | 1/2007 | Chang et al. ................ 362/97.2 |
| 7,461,958 | B2 * | 12/2008 | Takata et al. ................. 362/433 |
| 2008/0007947 | A1 * | 1/2008 | Yokota et al. ................ 362/396 |

FOREIGN PATENT DOCUMENTS

| CN | 1588205 | 3/2005 |
| CN | 1306330 C | 3/2007 |

* cited by examiner

*Primary Examiner*—Stephen F Husar
(74) *Attorney, Agent, or Firm*—Winston Hsu; Scott Margo (57) ABSTRACT

A lamp holder applied in a backlight module includes a base and at least one clamp element. The base has a high reflectivity, while the clamp element is of a transparent and fluorescent characteristic. In addition, the clamp element has a clamp part to hold the lamp. When light radiates from the lamp, the light of the lamp can penetrate through the clamp element.

10 Claims, 9 Drawing Sheets

LAMP HOLDER

BACKGROUND OF THE INVENTION

1. Field of the Invention

The present invention relates to a lamp holder, and more particularly, to a lamp holder with transparent and fluorescent characteristics.

2. Description of the Prior Art

The backlight module, which is a key element in the fabrication of liquid crystal displays, is widely used in digital cameras, PDAs, vehicle satellite navigation systems, computer monitors, flat panel TVs and so on. Light from the backlight module penetrates the display panel and forms various images controlled by pixel electrodes arranged on the display panel. According to different locations of the backlight modules, backlight modules are typically divided into two major categories: edge light type and direct-type.

Figure 1:
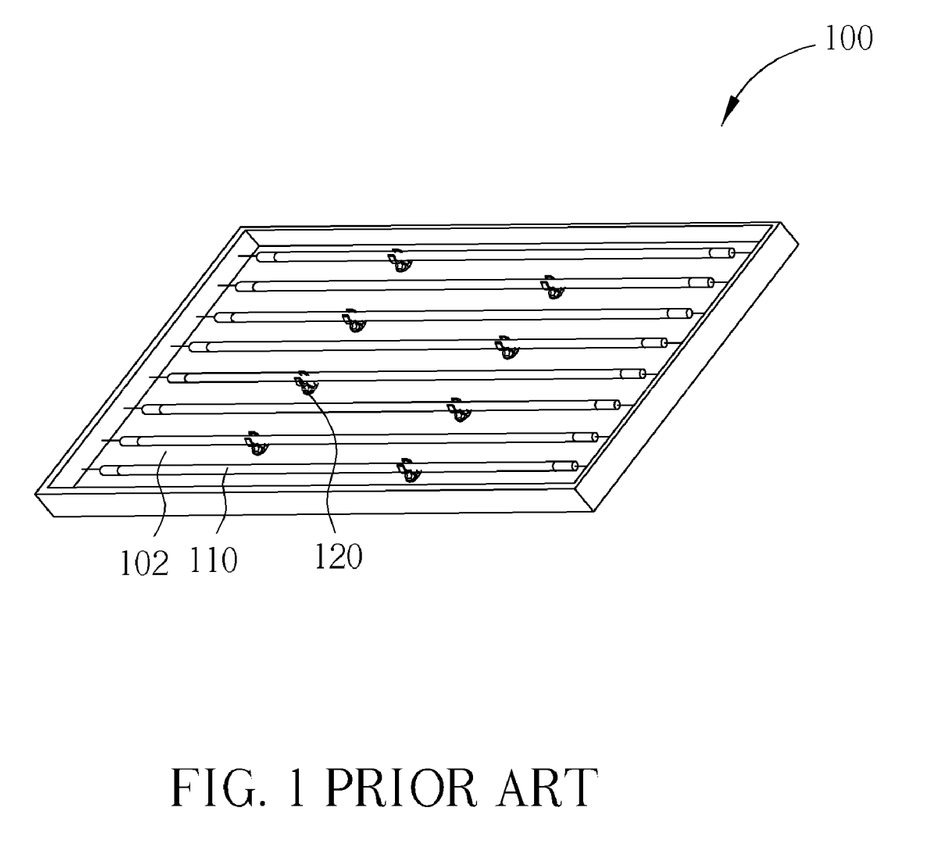
FIG. 1 shows a conventional backlight module and a conventional lamp holder.
Figure 2:
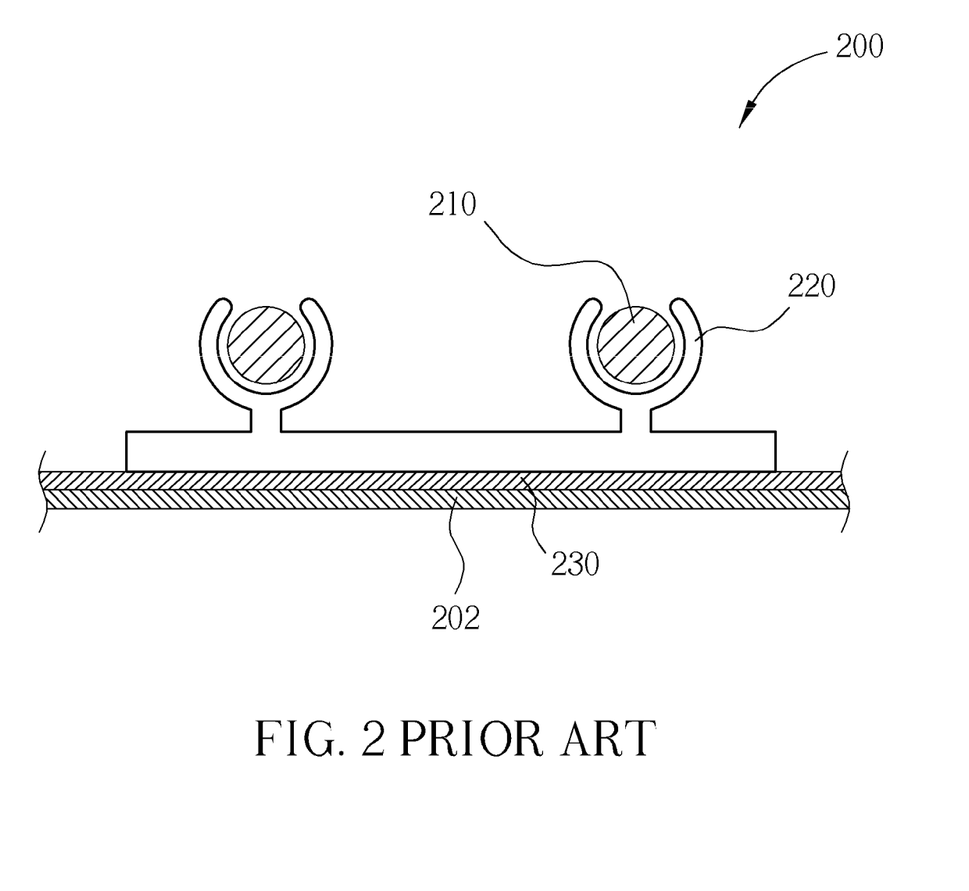
FIG. 2 depicts a schematic diagram of a side view of a conventional lamp holder on a bottom plate.

The lamp in the backlight module is often held by a lamp holder. FIG. 1 shows a conventional backlight module 100 and a conventional lamp holder 120. The backlight module 100 includes a bottom plate 102, a plurality of lamps 110 and a plurality of lamp holder 120. Please refer to FIG. 2. The lamp holder 220 positioned on the bottom plate 202 and reflecting sheet 230 is used to hold a lamp 210 so as to avoid deformation of the lamp 210 due to gravity. When the lamp 210 turns on, however, part of the light is blocked by the lamp holder 220. Therefore, mura problems and an uneven brightness around the lamp holder 220 on the lamp 210 may occur, resulting in a poor display quality.

SUMMARY OF THE INVENTION

Therefore, it is one objective of the present invention to provide a backlight module and a lamp holder thereon so as to improve optical performance.

According to a preferred embodiment of the present invention, a lamp holder comprises: a base whose material is of an opaque and reflective characteristic; and at least one clamp element whose material is of a transparent characteristic, the clamp element being connected to and fixed on the base, wherein the clamp element has a clamp part for clamping the lamp. When the lamp turns on, light emitting from the lamp can penetrate the clamp element and illuminate the clamp element.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
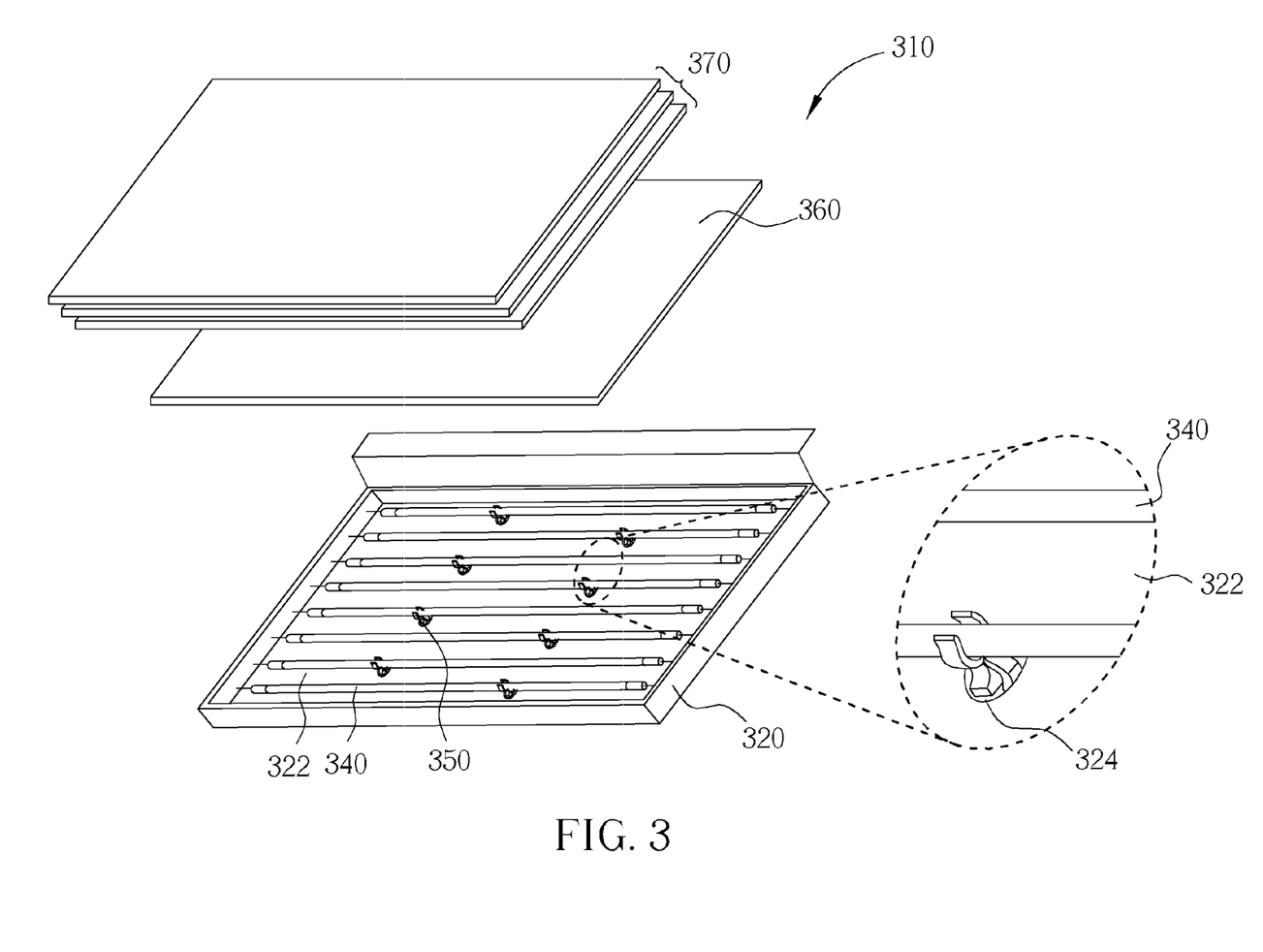
FIG. 3 depicts a schematic diagram of a backlight module according to a preferred embodiment of the present invention.

FIG. 3 depicts a schematic diagram of a backlight module 310 according to a preferred embodiment of the present invention. The backlight module 310 of the present invention may be direct-type or edge-type. The direct-type backlight module is described in the following description. As shown in FIG. 3, the backlight module 310 includes a bottom plate 320, a reflecting sheet 322, a plurality of lamps 340, at least a lamp holder 350, a diffusing sheet 360, and a least an optical film 370.

The reflecting sheet 322 is disposed between the lamp 340 and the bottom plate 320. A plurality of joint slots 324 are positioned on the bottom plate 320 and the reflecting sheet 322 for engaging the lamp holder 350 with the bottom plate 320 and the reflecting sheet 322. The reflecting sheet 322 may be disposed on the inner surface surrounding by the sidewall of the bottom plate 320, and can be further disposed on the sidewall of the bottom plate 320. The material of forming the reflecting sheet 322 is of a high reflective characteristic so as to reflect the light emitting from the lamp 340 to the light-exit face of the backlight module 310. The diffusing sheet 360 may be disposed above the lamp 340 to scatter the light emitting from the lamp 340 so as to form uniform brightness of the backlight module 310. The optical film 370 may be disposed above the diffusing sheet 360 so as to improve the optical performance of the backlight module 310. The shape, location and type of the bottom plate 320, the reflecting sheet 322, the diffusing sheet 360, and the optical film 370 can be changed according to different requirements. Generally speaking, numbers of the lamps 340 in the backlight module 310 can be altered due to different designs. The lamp 340 may be positioned collaterally or not collaterally with equal distance or unequal distance along the length direction, the width direction or the thickness direction of the backlight module 310. The lamp 340 may include a cylinder body, but is not limited to this design. In the preferred embodiment, the lamp 340 may be a cold cathode fluorescent lamp (CCFL), a hot cathode fluorescent lamp (HCFL) or other light source, and the shape of the lamp 340 may be cylindrical, U-shaped, or other shapes.

The lamp holder 350 is used to hold the lamp 340, and can engage the reflecting sheet 322 and the bottom of the bottom plate 320 firmly. It is noteworthy that numbers of the lamp holder 350 depends on the length and numbers of the lamp 340. Furthermore, the engaging method of the lamp holder 350, the reflecting sheet 322 and the bottom of the bottom plate 320 of a direct type backlight module can be changed to a way which is suitable for edge type backlight modules, for example, engaging the lamp holder with the lampshades of an edge type backlight module.

Figure 4:
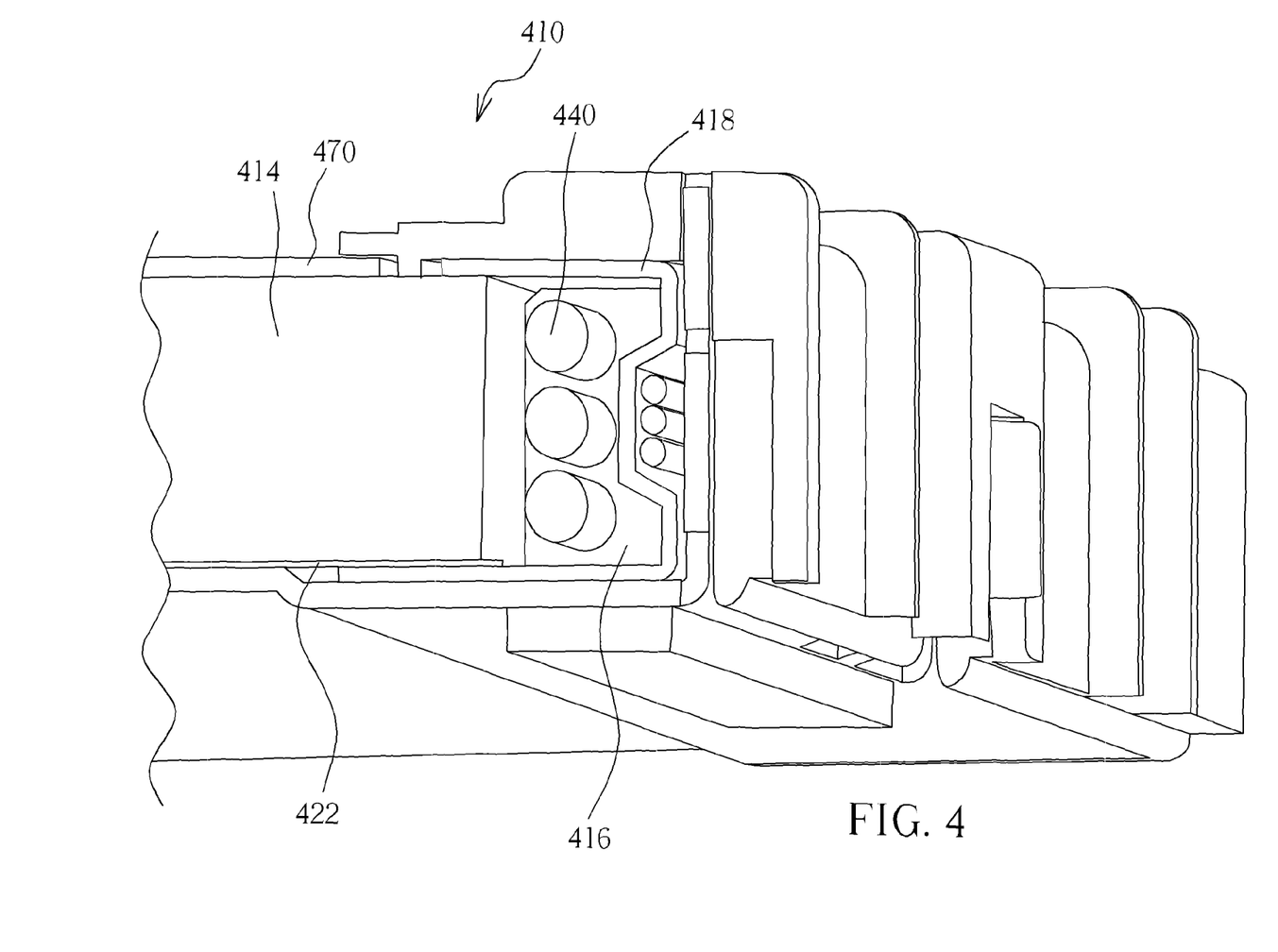
FIG. 4 depicts a schematic diagram of an edge type backlight module.
Figure 5:
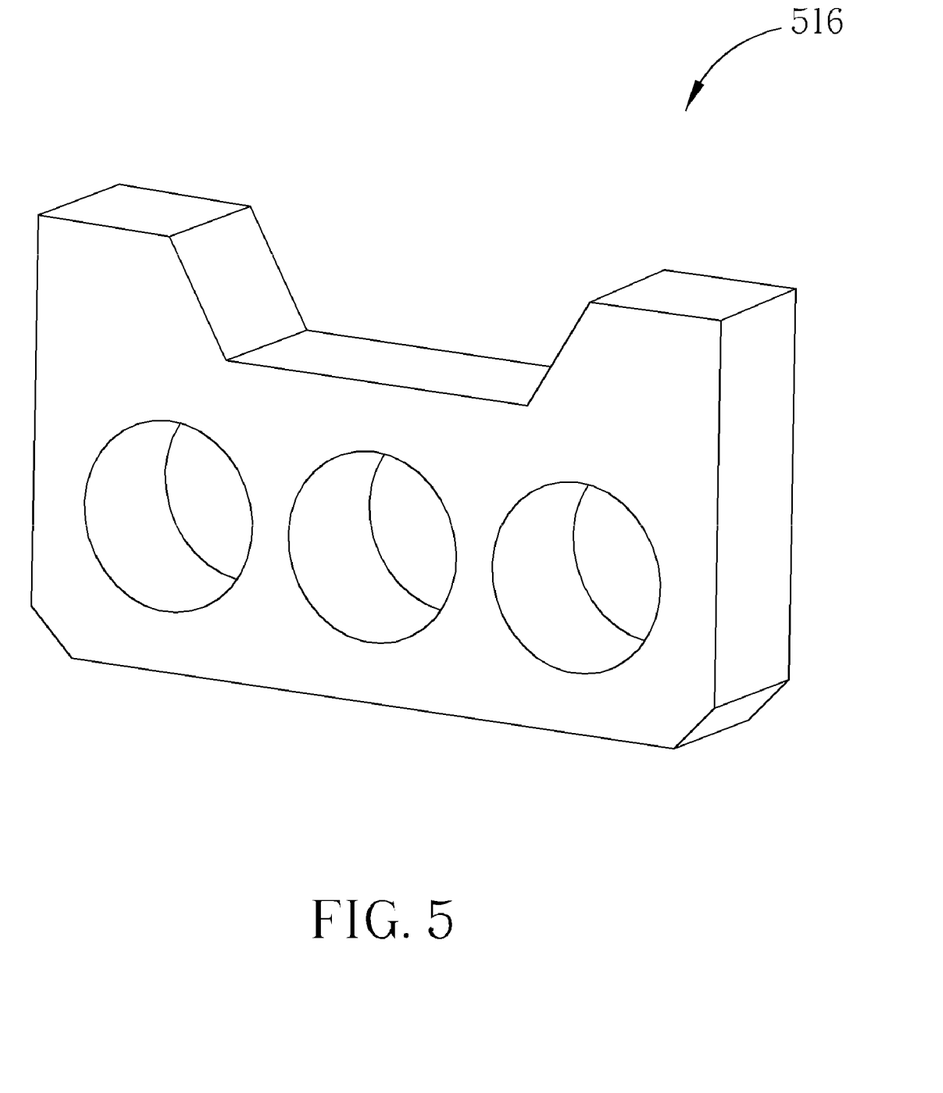
FIG. 5 shows the fixing element illustrated in FIG. 4.

FIG. 4 depicts a schematic diagram of an edge type backlight module 410. FIG. 5 shows a fixing element illustrated in FIG. 4. As shown in FIG. 4, the edge type backlight module 410 includes a light guide plate 414, a plurality of lamps 440 disposed at a side of the light guide plate 414, a lampshade 418 surrounding the lamp 440, a reflecting sheet 422 positioned below the light guide plate 414 to direct light penetrating the light guide plate 414 back to the light guide plate 414, an optical film 470 positioned on the light guide plate 414, and two lamp fixing elements 416 disposed at two ends of the lamp 440 to fix the lamp 440. As shown in FIG. 5, the lamp fixing element 516 can be integrally formed. The material forming the lamp fixing element 516 is of a transparent characteristic, preferably with full spectrum transmittance above 5% and haze below 95%.

Figure 6:
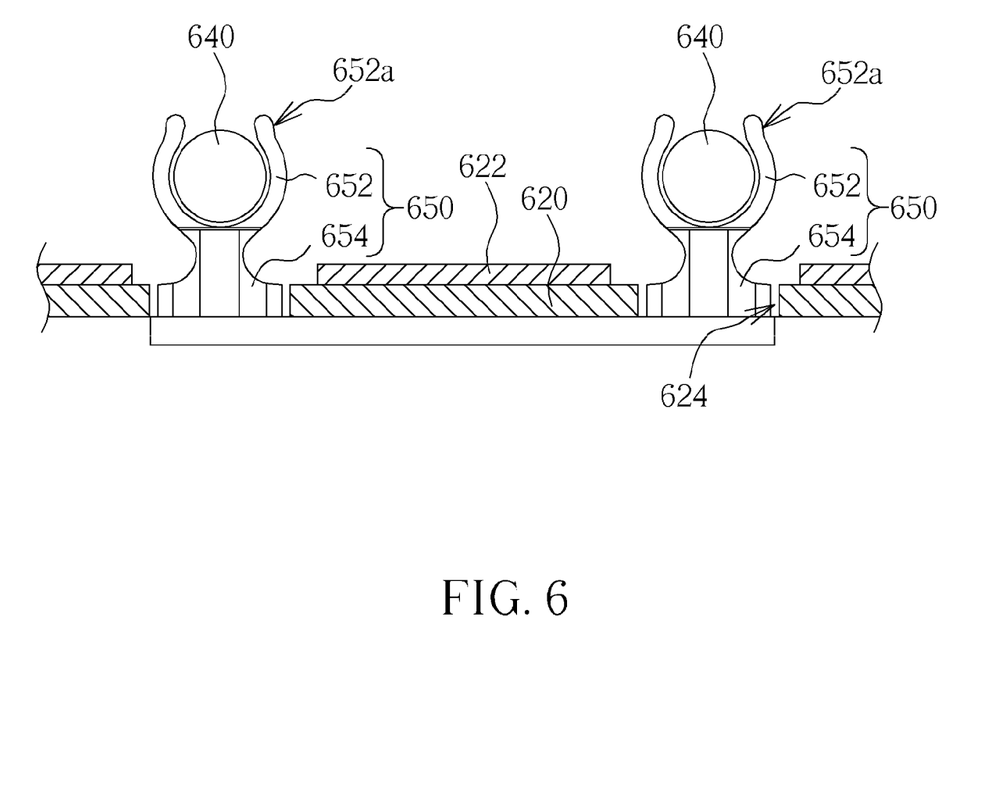
FIG. 6 depicts a schematic diagram of a side view of a lamp holder on the bottom plate according to a preferred embodiment of the present invention.

FIG. 6 depicts a schematic diagram of a side view of a lamp holder 650, a reflecting sheet 622 and a bottom plate 620 according to a preferred embodiment of the present invention. As shown in FIG. 6, each lamp holder 650 includes a clamp element 652 and a base 654. The material of forming the base 654 is of a high reflective characteristic. The material of forming the clamp element 652 is of a transparent characteristic, preferably with full spectrum transmittance above 5% and haze below 95%. The clamp element 652 connects to and fixes on the base 654, and the clamp element 652 includes a clamp part 652a for clamping the lamp 640. A plurality of joint slots 624 are disposed on the bottom plate 620 and the reflecting sheet 622 to engage with the lamp holder 650.

In the present embodiment, the base 654 and the clamp element 652 are integrally formed by double injection molding technique. The material forming the base 654 may be white plastics, or other high reflective materials. The material forming the clamp element 652 may be a material with fluorescent, transparent and high transmittance characteristics. For example, the material forming the clamp element 652 may be a transparent material with one or many fluorescent materials blending in the transparent material. The transparent material may be polymethacrylate plastic, polymethylmethacrylate or the like. The fluorescent material may use the same phosphor as that in the lamp 640, such as barium magnesium aluminate (BMA) phosphors, lanthanum cerium terbium phosphate (LAP) phosphors, or phosphors produced by Nichia Chemical used around LEDs. It is noteworthy that the base 654 is not limited to be made of white plastics, and the clamp element is not limited to be made of fluorescent transparent plastics. For example, based on different designs, the material used in the base 654 may include colors other than white. Moreover, material used in the base 654 and the lamp holder 652 may include additives for altering material characteristics, surface characteristics or additives for helping molding techniques. Furthermore, the base 654 and the lamp holder 652 can be integrally formed with a single fluorescent transparent material.

As shown in FIG. 6, because the clamp part 652a has an open region, and the clamp part 652a is of a transparent characteristic, dark regions that occur around the clamp holder in the prior art can be prevented. Furthermore, ultraviolet light with 365 nm or 313 nm or other wave lengths emitting from the lamp 640 can enter the clamp part 652a. By illuminating the clamp part 652a with ultraviolet light to excite the phosphors in the clamp part 652a, the clamp part 652a can be lit up. In this way, dark regions can be further lightened. Furthermore, the material forming the base 654 is of a high reflective characteristic therefore light emitting from the base 654 can be reflected to form uniform brightness on the light-exit face of the backlight module.

In the above embodiment, the base 654 and the lamp holder 652 are integrally formed by double injection molding technique. According to other preferred embodiments of the present invention, the base 654 is integrally formed individually and the lamp holder 652 is integrally formed individually. After formation of the base 654 and the lamp holder 652, the base 654 and the lamp holder 652 can be engaged by several methods such as buckling, gluing or locking.

Figure 7:
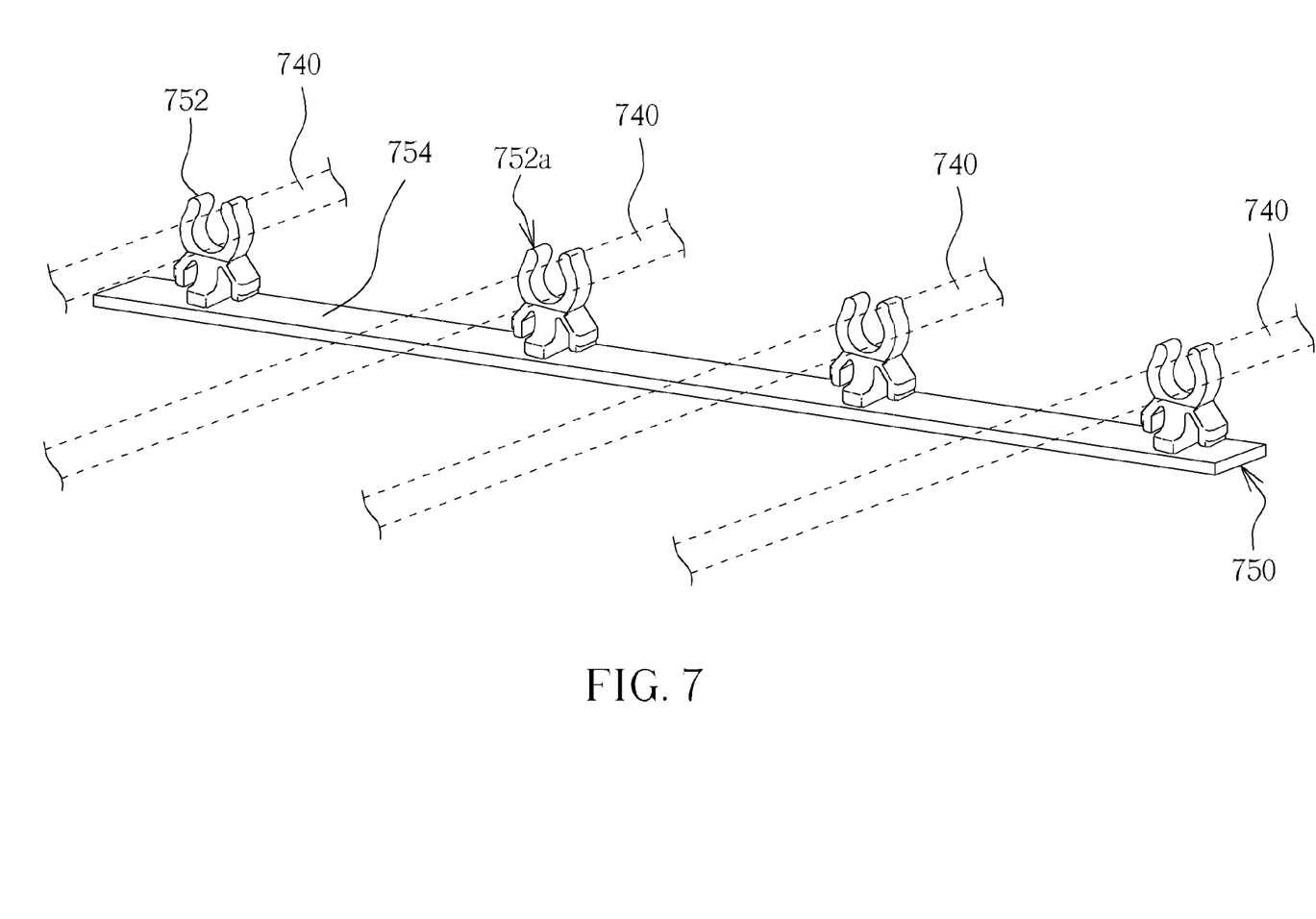
FIG. 7 shows a schematic diagram of lamp holders according to a preferred embodiment of the present invention.
Figure 8:
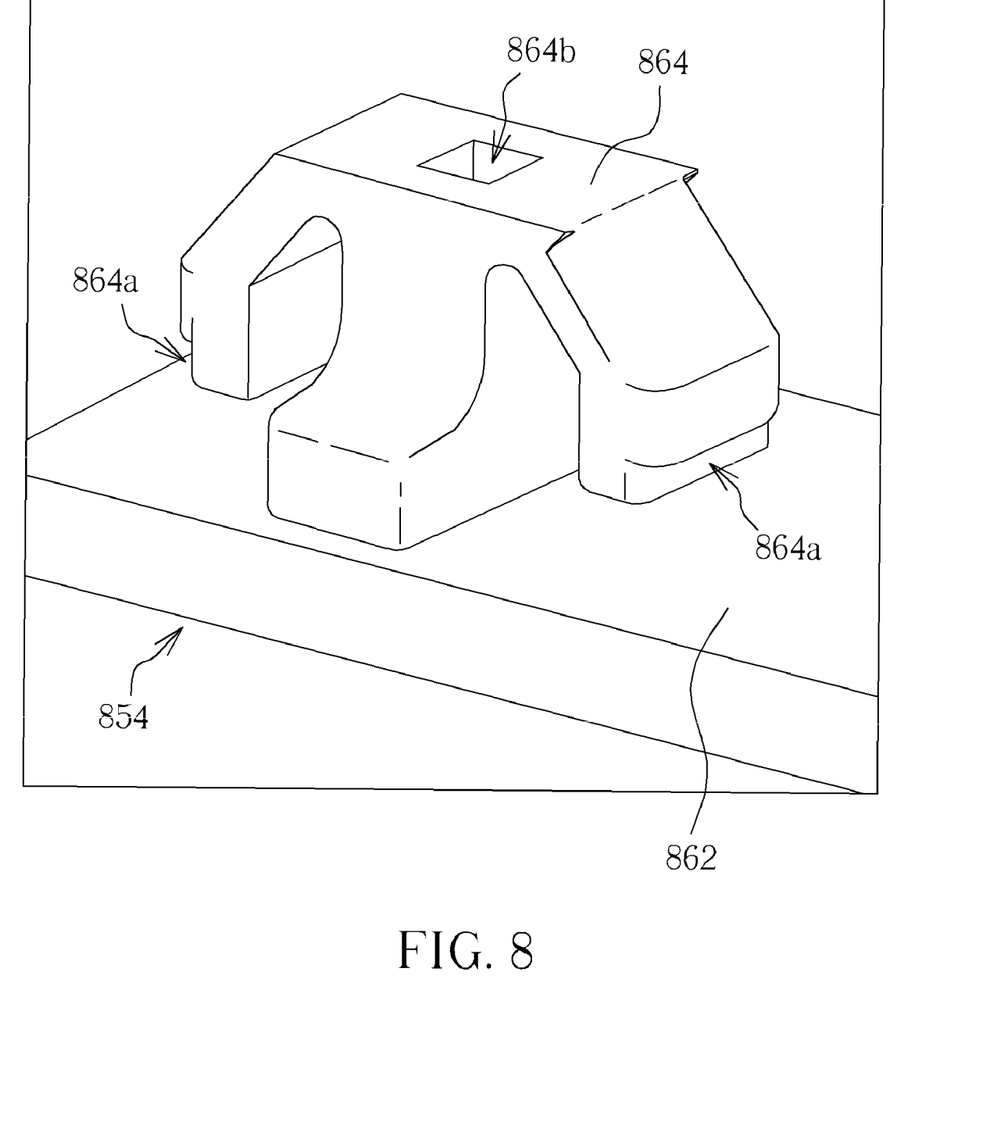
FIG. 8 shows a schematic diagram of the base of a lamp holder according to a preferred embodiment of the present invention.
Figure 9:
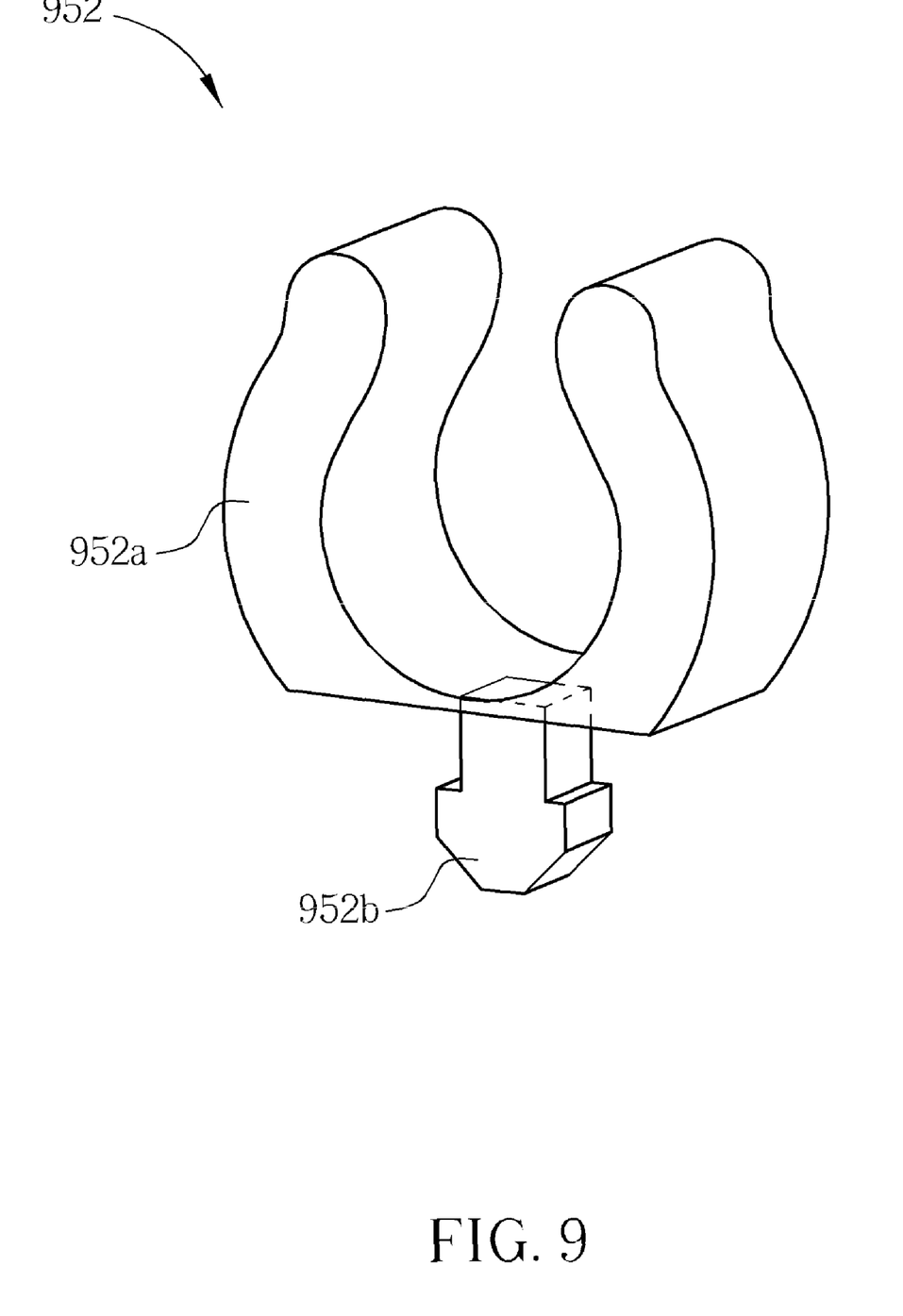
FIG. 9 shows a schematic diagram of the clamp part of a lamp holder according to a preferred embodiment of the present invention.

FIG. 7 shows a schematic diagram of lamp holders 750 holding lamps. FIG. 8 shows a schematic diagram of part of the base 754 in FIG. 7. FIG. 9 shows a schematic diagram of part of the clamp part 752a in FIG. 7. In order to show the structure of the lamp holder 750 clearly, the lamps 740 are shown in dotted lines in a perspective view. As shown in FIG. 7, each lamp holder 750 includes a lamp holder 752 and a base 754. The material of forming the base 752 is of a high reflective characteristic. The material of forming the clamp element 752 is of a fluorescent and transparent characteristic. In the present embodiment, the base 754 and the clamp element 752 are formed separately and individually. The material of forming the base 754 may be white plastics. The material of forming the clamp part 752a may be plastics with fluorescent and transparent characteristics.

As shown in FIG. 8, a base 854 includes a chassis 862 and at least one supportive element 864. The supportive element 864 comprises a base buckle 864a and a clamp slot 864b. The base buckle 864a can engage with the joint slot of the bottom plate so as to fix the lamp holder onto the bottom plate. As shown in FIG. 9 and FIG. 8, besides the clamp part 952a, the clamp element 952 further includes a clamp buckle 952b. The clamp buckle 952b of the clamp element 952 can engage with the clamp slot 864b of the base 854 in FIG. 8. The clamp element 952 and the base 854 can be formed by any suitable fabricating methods to form clamp element 952 with fluorescent and transparent characteristics and base 854 with a high reflective characteristic. For example, a high reflective film may be formed on the surface of the base. The high reflective film may be a white coating, a light color coating, or a mirror layer. Furthermore, a fluorescent coating can be formed on the surface of the clamp element.

The lamp element provided in the present invention is of a transparent characteristic. Therefore, light emitted from the lamp surrounded by the clamp element of the lamp holder can penetrate the clamp element, and the darkness on the light-exit face of the backlight module or other display panel can be avoided. Furthermore, the clamp element has an opening to expose part of the lamp facing the light-exit face. In other words, there is no shelter or barrier between the lamp and the light-exit face so the light can pass through without being scattered or reflected. Therefore, the darkness on the backlight module can be prevented. Moreover, the material of forming the clamp element is of a fluorescent and transparent characteristic, so the ultraviolet light emitting from the lamp can enter the fluorescent transparent material to lighten the clamp element and improve the uneven brightness of the backlight module.

Those skilled in the art will readily observe that numerous modifications and alterations of the device and method may be made while retaining the teachings of the invention.

What is claimed is:

1. A lamp holder utilized in a backlight module, the backlight module comprising a bottom plate, a reflective plate, a plurality of lamps, a diffusing sheet, and an optical film, the lamp holder for holding at least one of the lamps, the lamp holder comprising:
    a base whose material is of an opaque and reflective characteristic; and
    at least one clamp element whose material is of a transparent characteristic, the clamp element being connected to and fixed on the base, wherein the clamp element has a clamp part for clamping the lamp.

2. The lamp holder of claim 1, wherein the base and the clamp element are integrally formed by double injection molding technique.

3. The lamp holder of claim 2, wherein the material forming the base comprises a white plastic.

4. The lamp holder of claim 2, wherein the material forming the base comprises a plastic with a fluorescent and transparent characteristic.

5. The lamp holder of claim 4, wherein the plastic comprises a transparent plastic and a fluorescent material blending in the transparent plastic.

6. The lamp holder of claim 1, wherein the base comprises at least one clamp slot, the clamp element comprises a clamp buckle, and the clamp buckle of the clamp element engages with the clamp slot of the base.

7. The lamp holder of claim 6, wherein the base and the clamp element are formed separately.

8. The lamp holder of claim 7, wherein the material forming the base comprises a white plastic with a high reflective characteristic.

9. The lamp holder of claim 7, wherein the material forming the clamp element comprises a plastic with a fluorescent and transparent characteristic.

10. The lamp holder of claim 9, wherein the plastic comprises a transparent plastic and a fluorescent material dispersing in the transparent plastic.

* * * * *